3,164,639
PREPARATION OF LIQUID BOROHYDRO-CARBONS
Earl A. Weilmuenster, Kenmore, and Joel A. Zaslowsky, Niagara Falls, N.Y., assignors, by mesne assignments, to Olin Mathieson Chemical Corporation, a corporation of Virginia
Filed Jan. 19, 1956, Ser. No. 560,114
5 Claims. (Cl. 260—606.5)

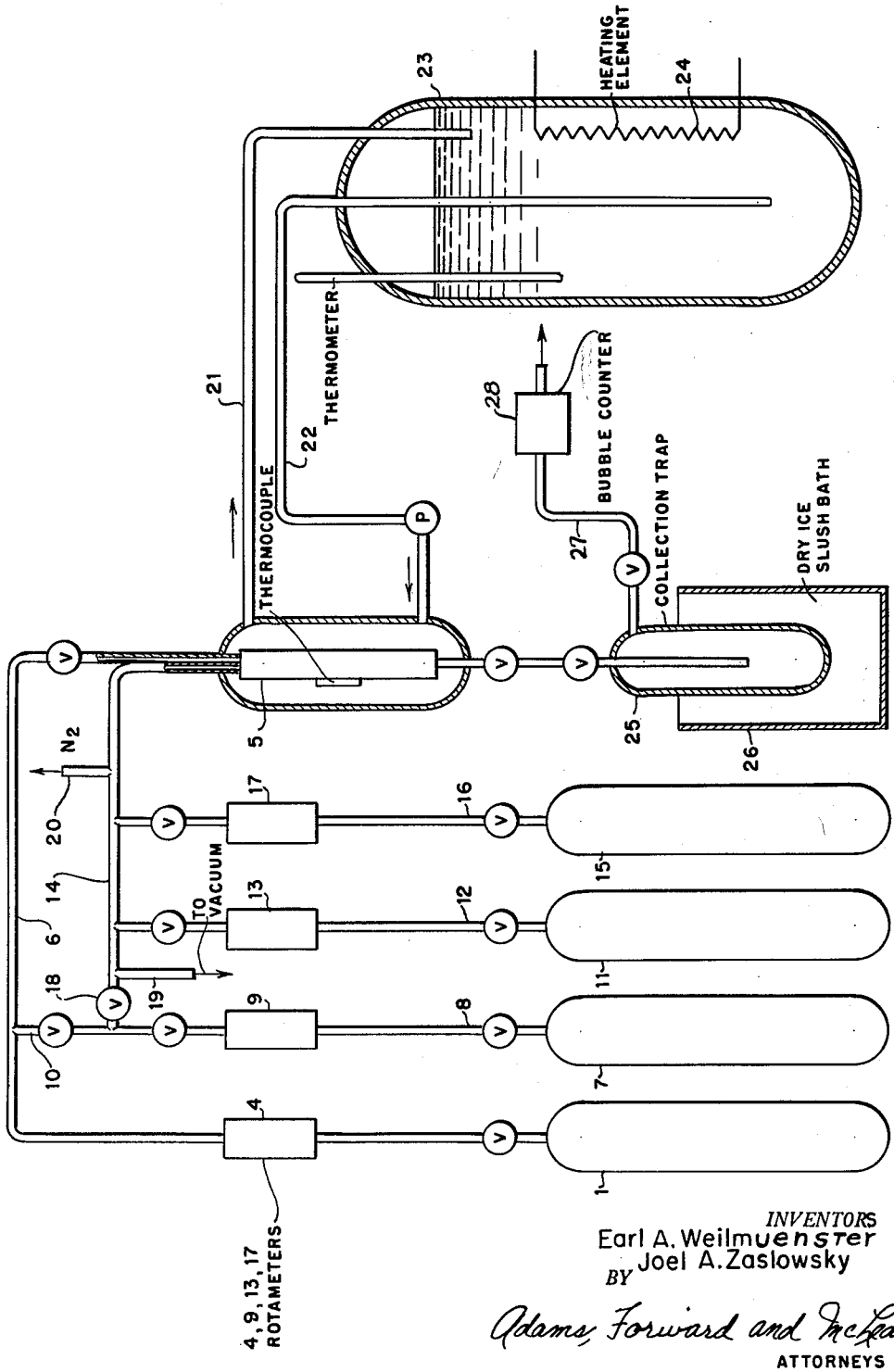

This invention relates to the production of relatively stable liquid borohydrocarbons by the reaction of diborane with an ethylene-acetylene mixture. The liquid borohydrocarbons are useful as high-energy fuels as described in application Serial No. 533,944, filed September 13, 1955, in the names of E. A. Weilmuenster and J. A. Zaslowsky.

The reaction of diborane with various hydrocarbons has been proposed and attempted previously. In general, the reaction of diborane with saturated hydrocarbons does not go while the reaction of diborane with unsaturated materials such as ethylene and acetylene goes with such intensity that a violent reaction resulting in decomposition of liquid products to gases and solid products occurs. One of the objects of our invention is to provide a process for producing boron-containing hydrocarbons in stable, relatively non-volatile liquid state such that the liquids can be utilized as high-energy fuels.

We have now found that liquid borohydrocarbons can be produced by reaction of diborane with an ethylene-acetylene mixture at a temperature of about 100° to 300° C. The diborane and unsaturated hydrocarbon gas mixture spontaneously react upon admixture under the condition of elevated temperature. The gases can be separately pre-heated and introduced to a reaction zone maintained at a controlled elevated temperature, or the cool gases can be introduced as such to the reaction zone, whereupon a short induction period, depending upon the temperature, is usually observed before reaction takes place. Reaction is exothermic and, therefore, once initiated is self-sustained. Depending upon the size and the design of reactor and the volume of the reactants, it is at times desirable to provide means of cooling the reaction zone in order to control the temperature, preferably at about 100° to 250° C. The molar ratio of the diborane to the ethylene-acetylene mixture introduced into the reaction zone is 1:10 to 10:1, preferably 2:1 to 8:1. The molar ratio of ethylene to acetylene in the ethylene-acetylene mixture is 5:1 to 1:5.

The reaction products are chiefly liquids of low vapor pressure. Separation of the products from the reactor effluent can be accomplished by cooling or by extraction by a suitable solvent such as the liquid obtained from the reaction. Small amounts of solids formed can be removed from the liquid products by filtration or from the reactor gas stream by means of a cyclone separator. The remaining gas stream, consisting of a small amount of unreacted ethylene, acetylene, and diborane, can be recycled to the reactor. The desired amounts of make-up ethylene, acetylene, and diborane can then be added to maintain proper feed compositions.

Advantageously, during the initiation of the reaction, the diborane gas stream entering the reactor, the ethylene-acetylene gas stream entering the reactor, or both entering reactant streams are diluted with a suitable diluent gas such as hydrogen or nitrogen. We have found that this procedure minimizes the danger of a violent reaction during the start-up period. The proportion of hydrogen in the reactant feed streams may be varied but generally will constitute about 20 to 90 percent by volume of the reactant stream. The higher the proportion of diluent gas, in general the less is the risk of violent reaction. Immediately upon initiation of the reaction, the proportion of diluent gas in the reactant feed streams is decreased and after, for example, several minutes is reduced to zero.

Our invention will be further described with reference to the simplified diagrammatic flow-plan of the accompanying drawing.

Diborane from storage tank 1 is passed through flow rotometer 4 to jacketed reaction tube 5 by means of valved line 6. Hydrogen, or other diluent gas such as nitrogen, is passed from storage tank 7 through valved line 8, rotormeter 9 and valved line 10 into line 6 and hence into reaction tube 5. Ethylene from storage tank 11 is passed through valved line 12 and rotometer 13 into line 14 and hence into reaction tube 5. Similarly, acetylene from storage tank 15 is passed through valved line 16, rotometer 17 and line 14 into reaction tube 5. By regulation of valve 18 in line 14, hydrogen may be introduced into the hydrocarbon stream entering reaction tube 5 through line 14. Also leading from line 14 are lines 19 to vacuum and 20 to a nitrogen source.

The temperature in reaction tube 5 is maintained by appropriate circulation of a heating and/or cooling medium such as oil through lines 21, 22 and reservoir 23. A thermometer in oil reservoir 23 and a thermocouple situated in reaction tube 5 assist in regulation of the oil temperature by means of heating element 24. The temperature in reaction tube 5 is maintained at a level that induces reasonable reaction but below a level that promotes decomposition of products or excessive formation of solid products or explosive violence. A temperature of about 100° to 250° C. appears to be desirable. Below 100° C. the reaction is slow. At temperatures above 200° C. increasing amounts of undesirable high molecular weight solids are formed.

After a short residence time in reaction tube 5, the reaction mixture is passed into collection trap 25, cooled by Dry Ice slush bath 26 wherein liquid products are condensed. The uncondensed gas stream passes through valved line 27, bubble counter 28 and a valved line (not shown) to recycle.

The following example further illustrates the process of our invention. The reactions described in the example were performed employing the equipment described in the drawing.

*Example*

The reaction tube 5 consisted of a vertical glass tube (½ inch by 8 inches) heated by means of oil circulating through a jacket. Collection trap 25 was cooled with Dry Ice and trichloroethylene to −78° C. A safety manometer (bubble counter 28) was connected to this trap. The entire system was maintained under an inert atmosphere of nitrogen from line 20 at all times. A thermocouple and a glass wall about 2 inches below the point of entry of the gas into the reaction tube 5 was used to measure the temperature. A thermometer in the oil reservoir measured its temperature.

The reaction tube 5 was brought to operating temperature by circulating oil through the jacket until the jacket temperature reached 130° C. At this temperature diborane at the rate of 50 ml. per minute at STP, ethylene at the rate of 126 ml. per minute at STP, acetylene at the rate of 40 ml. per minute at STP and hydrogen at the rate of 400 ml. per minute at STP were brought together in reaction tube 5. Diborane and a portion of the hydrogen were mixed together in line 6 entering the reaction tube 5 and ethylene and acetylene and the remainder of the hydrogen were mixed in line 14 and passed into the reaction tube 5. The formation of a white cloud indicated that the reaction had started. During the next 5 minutes the flow of hydrogen into lines 6 and 14 was gradually reduced and completely terminated at the end of the 5 minute period. The reaction was continued for an additional 75 minute period during which time the temperature of the circulating oil stream was maintained at 136° to 137° C. The temperature inside reaction tube 5 rose to a maximum of 228° C.

The product retained in collection trap 25 was a clear liquid and was maintained at −78° C. for approximately 2 hours under a vacuum of $10^{-3}$ ml. of mercury in order to remove dissolved gases. The product was then allowed to warm to room temperature and the volatile liquid portion was transferred, under vacuum, to a second collection trap cooled with liquid nitrogen. Analysis of this volatile fraction indicated that it contained 13.7 percent boron. The non-volatile portion of the liquid fraction was also analyzed and found to contain 19.2 percent boron.

The following table shows the time, temperature, and rate of gas introduction during the course of this reaction.

| Time, Minutes | Temperature, °C. | | Flow Rates, ml./min. | | | |
| --- | --- | --- | --- | --- | --- | --- |
| | Oil | Thermocouple | $H_2$ | $B_2H_6$ | $C_2H_4$ | $C_2H_2$ |
| 0 | 136 | 202 | 400 | 50 | 126 | 40 |
| 5 | 136 | 159 | 0 | 36 | 103 | 40 |
| 15 | 136 | 156 | 0 | 27.5 | 98 | 42 |
| 25 | 137 | 173 | 0 | 25 | 94 | 37 |
| 30 | 137 | 228 | 0 | 25 | 94 | 40 |
| 33 | 137 | 224 | 0 | 25 | 94 | 40 |
| 60 | 140 | 138 | 0 | 25 | 94 | 40 |
| 75 | | 120 | 0 | 0 | 0 | 0 |

We claim:

1. A process for the production of liquid borohydrocarbons which comprises reacting diborane gas in a molar ratio of 1:10 to 10:1 with a gaseous mixture of ethylene and acetylene in which the molar ratio of ethylene to acetylene is 5:1 to 1:5 at a temperature of about 100° to 300° C., and recovering liquid products from the reaction mixture.

2. The process of claim 1 in which the reaction temperature is about 100°–250° C.

3. The process of claim 1 in which the reaction is initiated while the reactant gases are in admixture with an inert diluent gas constituting about 20 to 90 percent by volume of the reactant gas mixture.

4. The process of claim 3 in which the reaction temperature is about 100°–250° C.

5. A process for the production of liquid borohydrocarbons which comprises reacting acetylene and ethylene with diborane at an elevated temperature and recovering the product of the reaction.

References Cited by the Examiner

UNITED STATES PATENTS 2,968,540   1/61   Huff et al. _____ 260—606.5

OTHER REFERENCES

Hurd: J. Amer. Chem. Soc. 70, pages 2053–55 (1948)
Stock et al.: Berichte, 56, page 802 (1923).

TOBIAS E. LEVOW, *Primary Examiner.*
ROGER L. CAMPBELL, LEON D. ROSDOL,
*Examiners.*